United States Patent
Mandavilli et al.

(10) Patent No.: US 10,588,055 B2
(45) Date of Patent: Mar. 10, 2020

(54) METHODS AND APPARATUS FOR NETWORK SELECTION

(71) Applicant: QUALCOMM Incorporated, San Diego, CA (US)

(72) Inventors: Ravi Teja Mandavilli, Bangalore (IN); Prathviraj Shetty, Bangalore (IN); Vitesh Kempanna Nataraj, Bangalore (IN); Pavan Kumar Patted, Bellary (IN); Sravan Kumar Reddy Achamola, Hyderabad (IN); Kiran Koona, Miyapur (IN)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 15/841,683

(22) Filed: Dec. 14, 2017

(65) Prior Publication Data

US 2019/0191342 A1 Jun. 20, 2019

(51) Int. Cl.
*H04W 36/00* (2009.01)
*H04W 48/18* (2009.01)
*H04W 76/16* (2018.01)
*H04W 36/08* (2009.01)
*H04W 16/14* (2009.01)
*H04W 72/04* (2009.01)

(52) U.S. Cl.
CPC ....... *H04W 36/0022* (2013.01); *H04W 36/08* (2013.01); *H04W 48/18* (2013.01); *H04W 76/16* (2018.02); *H04W 16/14* (2013.01); *H04W 72/0493* (2013.01)

(58) Field of Classification Search
None
See application file for complete search history.

(56) References Cited

U.S. PATENT DOCUMENTS

| 7,596,378 B1 * | 9/2009 | Nizri | H04W 60/04 455/448 |
|---|---|---|---|
| 2005/0181801 A1 * | 8/2005 | Funnell | H04W 48/16 455/452.2 |
| 2009/0068969 A1 * | 3/2009 | Lindoff | H04W 48/18 455/161.1 |
| 2013/0210415 A1 | 8/2013 | Mathias et al. | |
| 2014/0066038 A1 * | 3/2014 | Sane | H04W 52/0274 455/418 |

OTHER PUBLICATIONS

International Search Report and Written Opinion—PCT/US2018/059458—ISA/EPO—dated Dec. 19, 2018.

* cited by examiner

*Primary Examiner* — James P Duffy
(74) *Attorney, Agent, or Firm* — QUALCOMM Incorporated

(57) ABSTRACT

Methods and apparatus related to wireless communication, for example, methods and apparatus for network mode selection are described. In aspects, a method of wireless communication may include determining, by a user equipment (UE) while coupled to a first network using a first RAT, operation in a cellular data off mode, and determining whether to initiate selection or reselection to a second network using a second RAT based on a RAT power consumption data table. Numerous other aspects are provided.

25 Claims, 8 Drawing Sheets

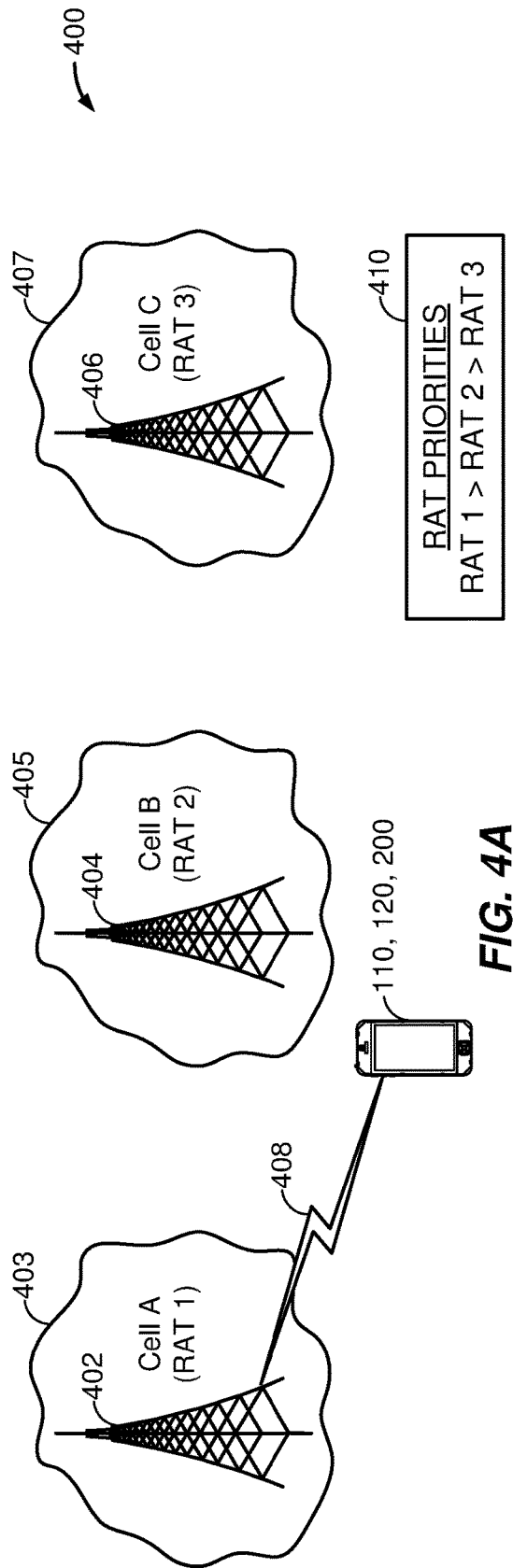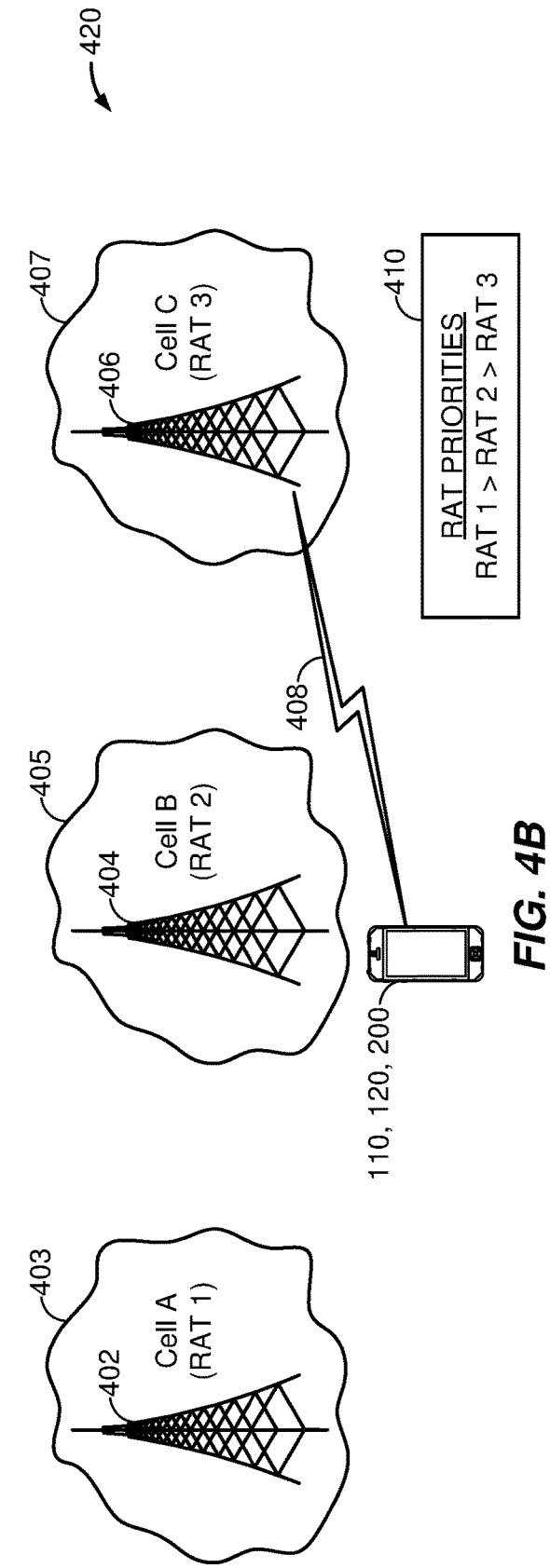

500

| Radio Access Technology (RAT) | POWER CONSUMPTION |
|---|---|
| RAT 1 | X mW |
| RAT 2 | Y mW |
| RAT 3 | Z mW |

*FIG. 5*

METHODS AND APPARATUS FOR
NETWORK SELECTION

FIELD OF THE DISCLOSURE

Aspects of the present disclosure generally relate to wireless communication, and more particularly to techniques and apparatuses for network selection.

BACKGROUND

Some new designs of user equipment (UEs)—such as smart phones, tablet computers, and laptop computers—include two or more radio access technologies ("RATs") that enable the devices to couple to different radio access networks. Examples of radio access networks include Third Generation (G-3), Fourth Generation (G-4), Long Term Evolution (LTE), Time Division Multiple Access (TDMA), Code Division Multiple Access (CDMA), Wideband CDMA (WCDMA), Global System for Mobile (GSM), and Universal Mobile Telecommunications Systems (UMTS). UEs may also include two or more radio-frequency (RF) communication circuits or "RF resources" to provide users with access to separate networks via the two or more RATs.

When a UE includes a plurality of RATs, each RAT on the device may utilize a different RF resource to communicate with its associated network at any time. For example, a first RAT (e.g., a LTE RAT) may use a first transceiver to transmit to a LTE base station and a second RAT (e.g., a UMTS RAT) uses a second transceiver to transmit to a UMTS base station. However, as the demand for mobile broadband access continues to increase, there exists a need for further improvements in the technology. One such need is for improvement is network selection.

SUMMARY

Various embodiments provide methods, devices, and non-transitory processor-readable storage media for network selection. For example, in an aspect of the disclosure, a method of wireless communication includes determining, by a user equipment (UE) while coupled to a first network using a RAT, operation in a cellular data off mode, and determining whether to initiate selection or reselection to a second network using a second RAT based on RAT power consumption data.

In an additional aspect of the disclosure, a wireless communication device for wireless communication includes a memory and at least one processor coupled to the memory, the at least one processor configured to determine, by a user equipment (UE) while coupled to a first network using a RAT, operation in a cellular data off mode, and determine whether to initiate selection or reselection to a second network using a second RAT based on RAT power consumption data.

In an additional aspect of the disclosure, a non-transitory computer-readable medium stores one or more instructions for wireless communication by a wireless communication device, the one or more instructions, when executed by one or more processors of a user equipment (UE), causing the one or more processors to determine, by the UE while coupled to a first network using a RAT, operation in a cellular data off mode, and determine whether to initiate selection or reselection to a second network using a second RAT based on RAT power consumption data.

In an additional aspect of the disclosure, an apparatus for wireless communication includes means for determining, by a user equipment (UE) while coupled to a first network using a RAT, operation in a cellular data off mode, and means for determining whether to initiate selection or reselection to a second network using a second RAT based on RAT power consumption data.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIGS. 4A-4B are component block diagrams illustrating examples of network selection by a user equipment UE in accordance with aspects of the present disclosure.

FIG. 5 is an exemplary RAT power consumption data in accordance with various aspects of the present disclosure.

DETAILED DESCRIPTION

Figure 1:
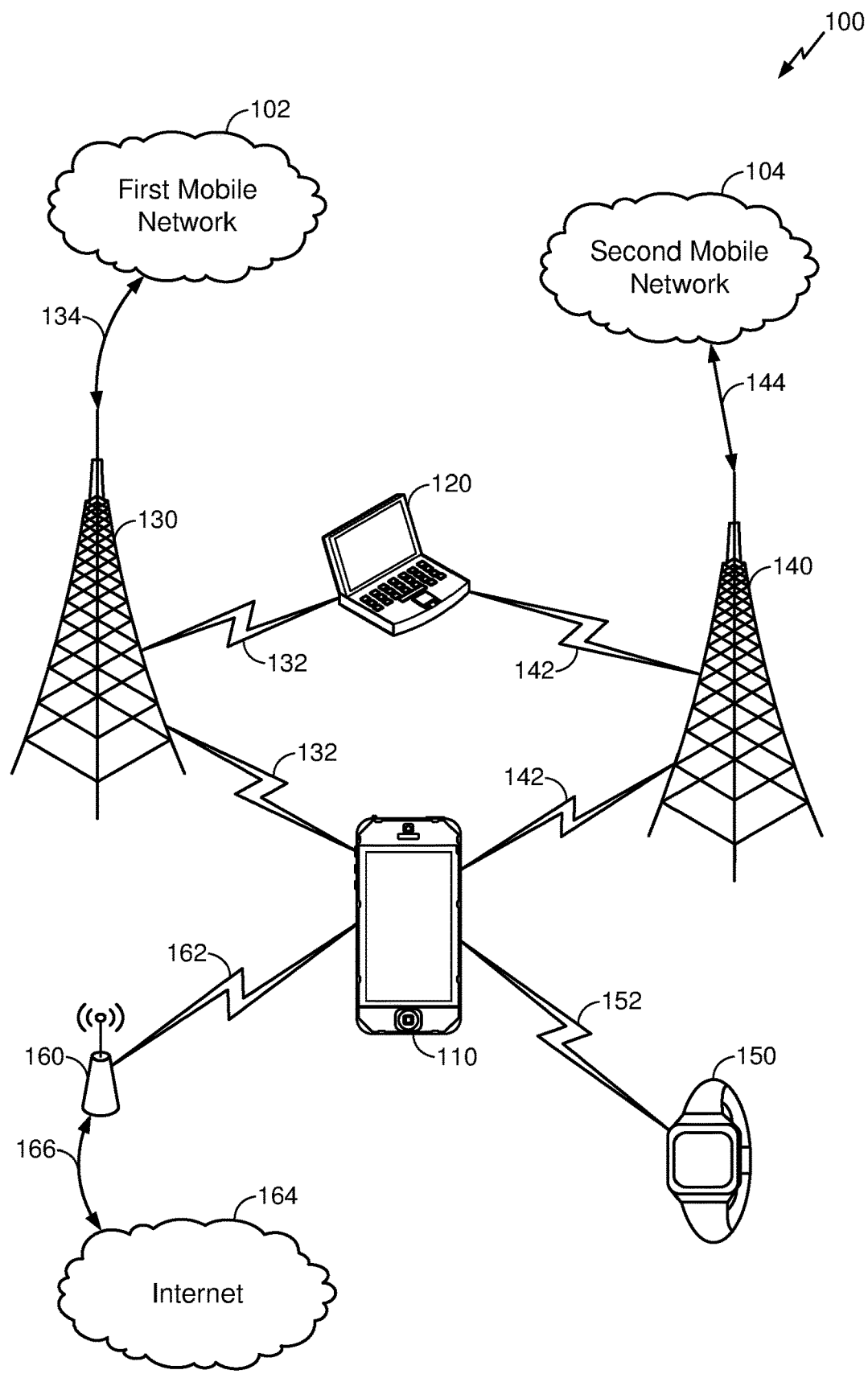
FIG. 1 is a communication system block diagram of mobile telephony networks in accordance with various aspects of the present disclosure.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The techniques described herein may be used for one or more of various wireless communication networks such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT) such as universal terrestrial radio access (UTRA), CDMA2000, and/or the like. UTRA may include wideband CDMA (WCDMA) and/or other variants of CDMA. CDMA2000 may include Interim Standard (IS)-2000, IS-95 and IS-856 standards. IS-2000 may also be referred to as 1× radio transmission technology (1×RTT), CDMA2000 1×, and/or the like. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, and/or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above as well as other wireless networks and RATs.

As used herein, the terms "user equipment" and "mobile communication device" are used interchangeably and refer to any one or all of cellular telephones, smart phones, personal or mobile multi-media players, personal data assistants, laptop computers, personal computers, tablet computers, smart books, palm-top computers, wireless electronic mail receivers, multimedia Internet-enabled cellular telephones, wireless gaming controllers, and similar personal electronic devices that include a programmable processor, memory, and circuitry for connecting to at least two mobile communication networks. The various aspects may be useful in UEs, such as smart phones, and so such devices are referred to in the descriptions of various embodiments.

Existing network selection is inefficient. A UE will seek and acquire service on a system/Radio Access Technology (RAT) regardless of an operating state of the UE and regardless of a power consumption associated with such RAT. For example, a UE may operate (e.g., by default) in a multi-RAT network mode. For example, a multi-RAT network mode may include a global network mode in which the UE will attempt to acquire service by searching RATs the UE supports (e.g., LTE/3G/2G/1×/TDSCDMA/etc.) in a particular order or preference until a suitable cell is found. In global network mode, the UE may search the supported RATs in an order or preference, for example, based on a metric, such as, achievable data rate using the RAT. Similarly, in one or more other multi-RAT network modes, the UE will attempt to acquire service by searching a subset of RATs the UE supports (e.g., LTE/3G) in a particular order or preference until a suitable cell is found. However, such approach to seek and acquire service by searching RATs in a predetermined or fixed order may not be efficient. For example, an operating state of a UE may change such that the metric may not be as relevant or as important in such changed state as other operating states for the UE. Additionally or alternatively, in such changed operating state, such approach may inefficiently consume and/or waste power, which may drain a battery of the UE.

Stated another way, battery draining is a major issue for a UE when the UE in a multi-RAT network mode like global network mode (e.g., LTE/3G/2G/1×/TDSCDMA etc.) (e.g., a default mode followed today). In global network mode, even when cellular data functionality is disabled or turned off (e.g., Mobile Data is OFF), the UE searches for a plurality or all RATs (e.g., LTE, 3G, 2G, 1×, TDSCDMA, etc.) and camps on to a RAT which is of good signal strength, irrespective of power consumption associated with that RAT (e.g., or the searched RATs) which would have adverse impact on battery power.

The present methods and apparatus provide improved network selection. In aspects, the present methods and apparatus select a network mode of operation to seek and acquire service on a system/Radio Access Technology (RAT) based on an operating state of the UE and/or a power consumption associated with such RAT.

Various embodiments may be implemented within a variety of communication systems 100 that include at least two mobile telephony networks, an example of which is illustrated in FIG. 1. A first mobile network 102 and a second mobile network 104 typically each include a plurality of cellular base stations (e.g., a first base station 130 and a second base station 140). A first user equipment (UE) 110 may be in communication with the first mobile network 102 through a cellular connection 132 to the first base station 130. The first UE 110 may also be in communication with the second mobile network 104 through a cellular connection 142 to the second base station 140. The first base station 130 may be in communication with the first mobile network 102 over a wired connection 134. The second base station 140 may be in communication with the second mobile network 104 over a wired connection 144.

A second UE 120 may similarly communicate with the first mobile network 102 through the cellular connection 132 to the first base station 130. The second UE 120 may communicate with the second mobile network 104 through the cellular connection 142 to the second base station 140. The cellular connections 132 and 142 may be made through two-way wireless communication links, such as 4G, 3G, CDMA, TDMA, WCDMA, GSM, and/or other mobile telephony communication technologies.

While the UEs 110, 120 are shown connected to the mobile networks 102, 104, in some embodiments (not shown) the UEs 110, 120 may include one or more subscriptions to two or more mobile networks 102, 104 and may couple or connect to those networks (e.g., concurrently).

In some embodiments, the first UE 110 may establish a wireless connection 152 with a peripheral device 150 used in connection with the first UE 110. For example, the first UE 110 may communicate over a Bluetooth® link with a Bluetooth-enabled personal computing device (e.g., a "smart watch"). In some embodiments, the first UE 110 may establish a wireless connection 162 with a wireless access point 160, such as over a Wi-Fi connection. The wireless access point 160 may be configured to connect to the Internet 164 or another network over a wired connection 166.

While not illustrated, the second UE 120 may similarly be configured to connect with the peripheral device 150 and/or the wireless access point 160 over wireless links. UE 110, 120 may perform the present methods and apparatus for network selection in accordance to aspects of the present disclosure.

Figure 2:
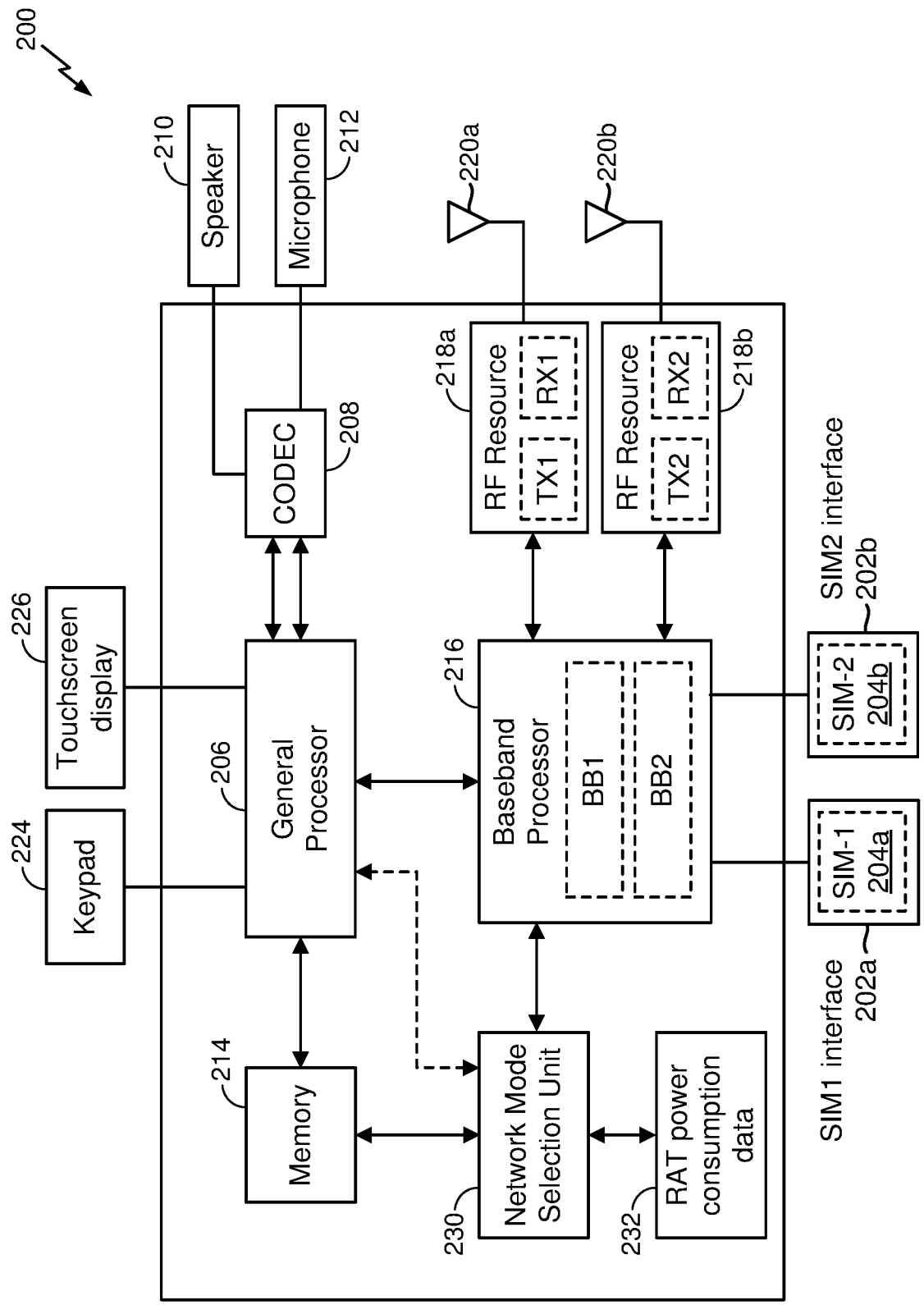
FIG. 2 is a component block diagram of a user equipment (UE) or wireless communication device in accordance with various aspects of the present disclosure.

FIG. 2 is a functional block diagram of a UE 200 suitable for implementing various embodiments. According to various embodiments, the UE 200 may be similar to one or more of the UEs 110, 120 as described with reference to FIG. 1. With reference to FIGS. 1-2, the UE 200 may include a first SIM interface 202a, which may receive a first identity module SIM-1 204a that is associated with a first subscription and/or RAT.

In optional embodiments, the UE 200 may optionally include a second SIM interface 202b, which may receive an optional second identity module SIM-2 204b that is associated with a second subscription and/or RAT.

A SIM in various embodiments may be a Universal Integrated Circuit Card (UICC) that is configured with SIM and/or Universal SIM applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. Each SIM card may have a central processing unit (CPU), read-only memory (ROM), random access memory (RAM), electrically erasable programmable read-only memory (EEPROM), and input/output (I/O) circuits.

A SIM used in various embodiments may contain user account information, an international mobile subscriber identity (IMSI), a set of SIM application toolkit (SAT) commands, and storage space for phone book contacts. A SIM card may further store home identifiers (e.g., a System Identification Number (SID)/Network Identification Number (NID) pair, a Home Public Land Mobile Number (HPLMN) code, etc.) to indicate the SIM card network operator provider. An Integrated Circuit Card Identity (IC-CID) SIM serial number is printed on the SIM card for identification. However, a SIM may be implemented within a portion of memory of the UE 200 (e.g., memory 214), and thus need not be a separate or removable circuit, chip or card.

The UE 200 may include at least one controller, such as a general processor 206, which may be coupled to a coder/decoder (CODEC) 208. The CODEC 208 may in turn be coupled to a speaker 210 and a microphone 212. The general processor 206 may also be coupled to the memory 214. The memory 214 may be a non-transitory computer readable storage medium that stores processor-executable instructions. For example, the instructions may include routing communication data relating to the first or second subscription though a corresponding baseband-RF resource chain.

The memory 214 may store an operating system (OS), as well as user application software and executable instructions. The memory 214 may also store application data, such as an array data structure.

The general processor 206 and the memory 214 may each be coupled to at least one baseband modem processor 216. The UE 200 may include one or more baseband-RF resource chains associated with and/or including the at least one baseband modem processor 216. For example, if the UE 200 include two SIMs, each SIM in the UE 200 (e.g., the SIM-1 204a and the SIM-2 204b) may be associated with a baseband-RF resource chain. A baseband-RF resource chain may include the baseband modem processor 216, which may perform baseband/modem functions for communicating with/controlling a RAT, and may include one or more amplifiers and radios, referred to generally herein as RF resources (e.g., RF resources 218a, 218b). In some embodiments, baseband-RF resource chains may share the baseband modem processor 216 (e.g., a single device that performs baseband/modem functions for all SIMs on the UE 200). In other embodiments, each baseband-RF resource chain may include physically or logically separate baseband processors (e.g., BB1, BB2).

In some embodiments, the RF resources 218a, 218b may be associated with different RATs. For example, a first RAT (e.g., a GSM or LTE RAT) may be associated with the RF resource 218a, and a second RAT (e.g., a CDMA or WCDMA RAT) may be associated with the RF resource 218b. The RF resources 218a, 218b may each be transceivers that perform transmit/receive functions on behalf of their respective RATs. The RF resources 218a, 218b may also include separate transmit and receive circuitry, or may include a transceiver that combines transmitter and receiver functions. The RF resources 218a, 218b may each be coupled to a wireless antenna (e.g., a first wireless antenna 220a or a second wireless antenna 220b). The RF resources 218a, 218b may also be coupled to the baseband modem processor 216.

In some embodiments, the general processor 206, the memory 214, the baseband processor(s) 216, and the RF resources 218a, 218b may be included in the UE 200 as a system-on-chip. In some embodiments, the first and second SIMs 204a, 204b and their corresponding interfaces 202a, 202b may be external to the system-on-chip. Further, various input and output devices may be coupled to components on the system-on-chip, such as interfaces or controllers. Example user input components suitable for use in the UE 200 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or to receive a telephone number. As another example, the request to initiate the outgoing call may be in the form of a voice command received via the microphone 212. Interfaces may be provided between the various software modules and functions in the UE 200 to enable communication between them, as is known in the art.

Functioning together, the two SIMs 204a, 204b, the baseband modem processor 216, the RF resources 218a, 218b, and the wireless antennas 220a, 220b may constitute two or more RATs. For example, a SIM, baseband processor and RF resource may be configured to support two different RATs, such as GSM or LTE and WCDMA. More RATs may be supported on the UE 200 by adding more SIM cards, SIM interfaces, RF resources, and/or antennae for connecting to additional mobile networks.

The UE 200 may include a network mode selection unit 230 configured to select a network mode of operation for the UE 200. In aspects, the network mode selection unit 230 may select a network mode of operation for the UE 200 based on an operating state of the UE and/or a power consumption associated with an associated RAT. In aspects, the network mode selection unit 230 may select a network mode of operation based on RAT power consumption data 232. In aspects, the RAT power consumption data 232 may associate one or more RATs with respective power consumption values. The RAT power consumption data 232 may select a network mode of operation for the UE 200 based on accessing RAT power consumption data 232. In some embodiments, the RAT power consumption data 232 may be implemented within a processor, such as the general processor 206 or a baseband processor 216. In some embodiments, the RAT power consumption data 232 may be implemented as a software application stored within the memory 214 and executed by the general processor 206 or a baseband processor 216. In some embodiments, the network mode selection unit 230 may be implemented within the general processor 206. In some embodiments, the network mode selection unit 230 may be implemented as a separate hardware component (e.g., separate from the general processor 206). In some embodiments, the RAT network mode selection unit 230 may be implemented as a software application stored within the memory 214 and executed by the general processor 206. In some embodiments, the RAT network mode selection unit 230 may select a network mode of operation for the UE 200 based on various criteria (see, e.g., FIGS. 6 and 7).

Figure 3:
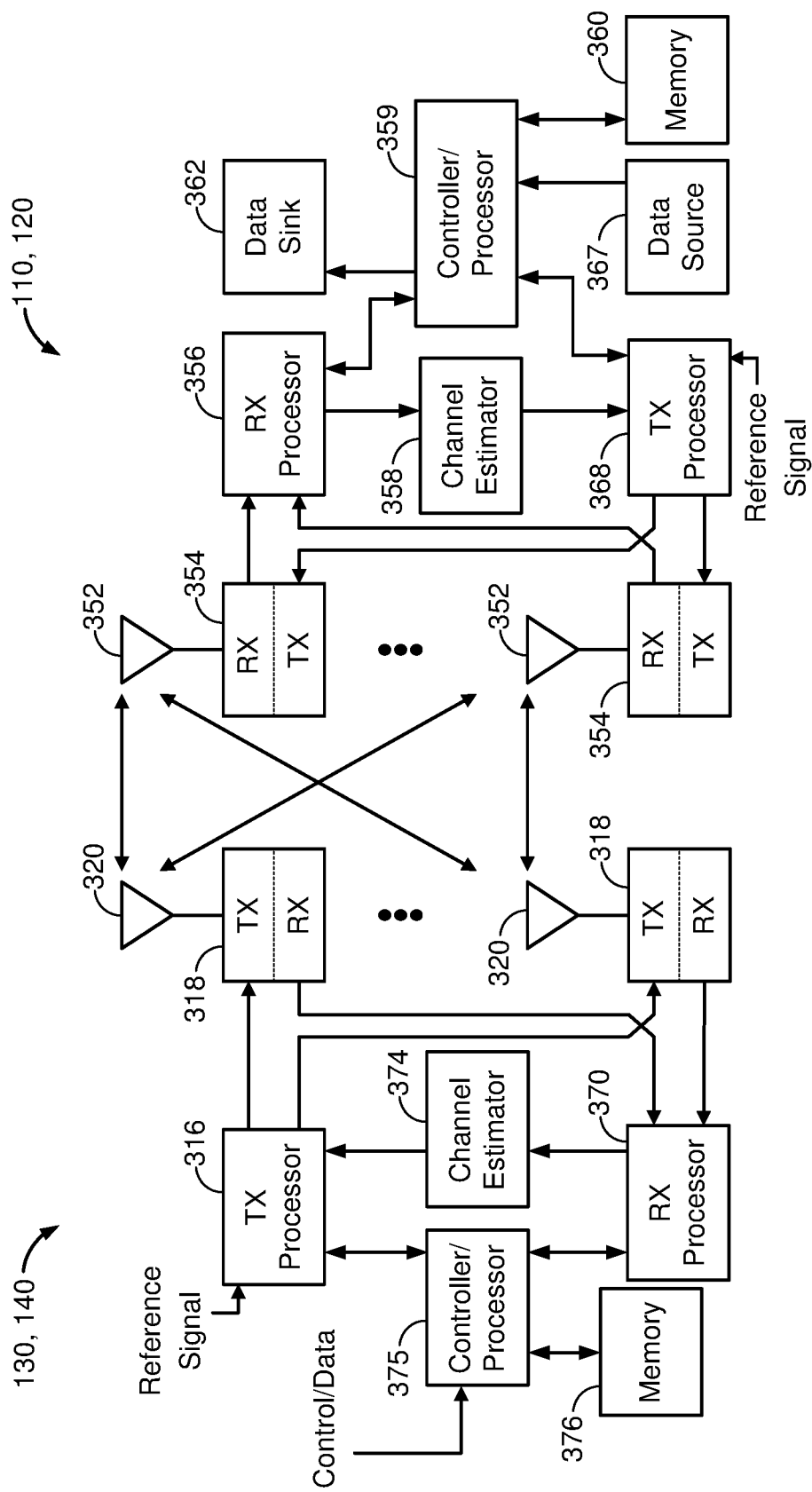
FIG. 3 is a block diagram of a base station in communication with a UE in an access network in accordance with various aspects of the present disclosure.

FIG. 3 is a block diagram of a base station 130, 140 in communication with a UE 110, 120 in an access network in accordance with various aspects of the present disclosure. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 110, 120, 200 based on various priority metrics. The controller/processor 375 is also responsible for HARQ operations, retransmission of lost packets, and signaling to the UE 350.

The TX processor 316 implements various signal processing functions for the L1 layer (e.g., physical layer). The signal processing functions includes coding and interleaving to facilitate forward error correction (FEC) at the UE 110, 120, 200 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 110, 120, 200. Each spatial stream is then provided to a different antenna 320 via a separate transmitter 318TX. Each transmitter 318TX modulates an RF carrier with a respective spatial stream for transmission.

At the UE 110, 120, 200, each receiver 354RX receives a signal through its respective antenna 352. Each receiver 354RX recovers information modulated onto an RF carrier and provides the information to the receiver (RX) processor 356. The RX processor 356 implements various signal processing functions of the L1 layer. The RX processor 356 performs spatial processing on the information to recover any spatial streams destined for the UE 110, 120, 200. If multiple spatial streams are destined for the UE 110, 120, 200, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 130, 140. These soft decisions may be based on channel estimates computed by the channel estimator 358. The soft decisions are then decoded and deinterleaved to recover the data and control signals that were originally transmitted by the eNB 130, 140 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations.

In the UL, a data source 367 is used to provide upper layer packets to the controller/processor 359. The data source 367 represents all protocol layers above the L2 layer. Similar to the functionality described in connection with the DL transmission by the eNB 130, 140, the controller/processor 359 implements the L2 layer for the user plane and the control plane by providing header compression, ciphering, packet segmentation and reordering, and multiplexing between logical and transport channels based on radio resource allocations by the eNB 130, 140. The controller/processor 359 is also responsible for HARQ operations, retransmission of lost packets, and signaling to the eNB 130, 140.

Channel estimates derived by a channel estimator 358 from a reference signal or feedback transmitted by the eNB 130, 140 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

In some cases, RX processor 356 and/or controller/processor 359 of UE 110, 120, 200 may be configured to perform various operations of the enhanced scanning procedures described herein.

The UL transmission is processed at the eNB 130, 140 in a manner similar to that described in connection with the receiver function at the UE 110, 120, 200. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 110, 120, 200. Upper layer packets from the controller/processor 375 may be provided to the core network. The controller/processor 375 is also responsible for error detection using an ACK and/or NACK protocol to support HARQ operations. In aspects, any one of the controller/processor 359, RX processor 356, and TX processor 368, memory 360 or a combination thereof of the UE 110, 120, 200 may be configured to perform the improved search and band scan methods discussed below. In an aspect, at least one of the controller/processor 359, RX processor 356, and TX processor 368 may be configured to execute algorithms stored in a memory 360 for performing the present network selection methods.

FIGS. 4A-4B are component block diagrams 400, 420 illustrating examples of network selection by a user equipment UE 110, 120, 200 in accordance with aspects of the present disclosure. With reference to FIGS. 1-4B, the UE 110, 120, 200 may include two RF resources (e.g., the RF resources 218a, 218b) for use in acquiring services via any of a first RAT (labeled in FIGS. 4A-4B as "RAT 1") such as LTE, for example, a second RAT (labeled in FIGS. 4A-4B as "RAT 2") such as UTRA, for example, and/or a third RAT (labeled in FIGS. 4A-4B as "RAT 3") such as 1×, for example. As described, the RATs on the UE 110, 120, 200 may be associated with the same subscription/SIM or with two or more different subscriptions.

For example, the UE 110, 120, 200 may be within service range of a first base station 402 (labeled in FIG. 4A as "Cell A") that is associated with the first RAT (e.g., of a first network 403), a second base station 404 (labeled in FIG. 4A as "Cell B") associated with the second RAT (e.g., of a second network 405), and a third base station 406 (labeled in FIG. 4A as "Cell C") associated with the third RAT (e.g., of a third network 407).

With reference to FIGS. 1-4A, in some embodiments, the UE 110, 120, 200 may determine an order in which the RATs are utilized to receive service. In some embodiments, the UE 110, 120, 200 may maintain a priority list 410 of the first, second, and third RATs used to determine the order in which the RATs are utilized to receive service. For example, the priority list 410 may list the first RAT as having the highest priority, followed by the second RAT and the third RAT, respectively. Thus, when the UE is in a multi-RAT network mode (e.g., LTE/3G/2G/1×/TDSCDMA), the UE 110, 120, 200 may attempt to acquire service with the first RAT (e.g., LTE RAT) first based on the priority list 410 because the first has the highest priority, the second RAT (e.g., 3G or UMTS RAT) second based on the priority list 410 because the second RAT has a next highest priority, and the third RAT (e.g., 1×RAT) third based on the priority list 410 because the third RAT has a next highest priority (e.g., in this example the lowest priority) regardless of an operating state of the UE and/or other factors, such as respective power consumptions associated with such RATs. In aspects, the UE 110, 120, 200 may select a multi-RAT network mode of operation from a plurality of network modes (e.g., global, LTE/3G/2G/1×/TDSCDMA, LTE/3G/2G/1×, LTE/3G/2G, 3G/2G/1×, LTE/3G/1×, LTE/3G, 3G/2G, LTE/1×, LTE, 3G, 1×, etc.). In aspects, the UE 110, 120, 200 may be in a multi-RAT network mode of operation by default (e.g., upon power up), and network mode selection by a user equipment UE 110, 120, 200 in accordance with aspects of the present disclosure may include determining by the UE 110, 120, 200 to remain in the multi-RAT network mode of operation. Consequently, based on the higher priority of the first RAT, the UE 110, 120, 200 may seek and acquire service on, and communicate over wireless connection 408 with the first cell 402.

In some embodiments, the UE 110, 120, 200 may reference RAT power consumption data 232 before acquiring service with a RAT. For example, the UE 110, 120, 200 may reference RAT power consumption data 232 to select a network mode of operation, and may acquire service with the RAT pursuant to the network mode of operation. A RAT power consumption data 232 may include various types of information that may enable a UE processor (e.g., the general processor 206, the baseband modem processor 216, the network mode selection unit 230, a separate controller, and/or the like) on the UE 110, 120, 200 to determine a RAT to use to acquire service to efficiently consume (e.g., save) power (e.g., as described with reference to FIGS. 6 and 7). The RAT power consumption data 232 may be preloaded on the UE 110, 120, 200, such as, for example, by the original equipment manufacturer of the UE 110, 120, 200. The RAT power consumption data 232 may also be received via user input, from a server, from one or more mobile networks associated with one or more subscriptions on the UE 110, 120, 200, etc.

In aspects, the UE 110, 120, 200 may reference the RAT power consumption data 232 to determine a RAT consuming a lower or lowest power among the first, second, and third RATs (e.g., when used by the UE 110, 120, 200 to acquire service). The UE 110, 120, 200 may select a network mode of operation based on such determination. For example, with reference to FIGS. 1-4B, prior to attempting to acquire service with any of the first, second, and/or third RATs, the UE 110, 120, 200 may reference RAT power consumption data 232 to determine a RAT consuming a lowest power among the first, second, and third RATs and/or to determine a RAT consuming a lower power than a RAT for a network to which the UE is registered. The UE 110, 120, 200 may select a network mode of operation based on the determined RAT. For example, the UE 110, 120, 200 may select a network mode of operation of 1×. In the 1× network mode of operation, the UE 110, 120, 200 will attempt to seek and acquire service using the 1×RAT (e.g., only seek and acquire service using the 1× RAT RAT 3 despite the RAT priorities and despite the UE 110, 120, 200 being within service range of a first base station 402 that is associated with the first RAT RAT1 and a second cell 404 associated with the second RAT RAT 2). As a result, as illustrated, the UE 110, 120, 200 may establish a wireless connection 408 with the third cell 406 and receive service via the third RAT. In aspects, the UE 110, 120, 200 may select a network mode of operation further based on an operating state of the UE 110, 120, 200 (e.g., whether cellular data functionality is enabled or turned on, or disabled or turned off). In this manner, the UE 110, 120, 200 may opportunistically reduce power consumption by connecting to a cell using a RAT associated with a lower or lowest power consumption. For example, when the UE 110, 120, 200 is in a state in which cellular data functionality is disabled or turned off, the UE 110, 120, 200 may not have to be in an RRC connected mode for data communication. The UE 110, 120, 200 may be in an RRC idle mode, for example, camped on a cell, to monitor for paging (e.g., associated with a mobile-terminated call).

In some embodiments, the UE 110, 120, 200 may continue acquiring service with the third RAT until the UE 110, 120, 200 determines that a state of the UE 110, 120, 200 has changed, which may occur for example when the UE 110, 120, 200 enters a state in which cellular functionality is enabled or on, or a power mode of the UE 110, 120, 200 is changed from a low power mode to a normal mode. In response to determining the changed state, the UE 110, 120, 200 may change its network mode of operation (e.g., for example revert back to the multi-RAT network mode like global mode) to cause a switch of services from the third RAT to the first RAT because the first RAT has a higher priority. Thus, the UE 110, 120, 200 may reduce or improve power consumption by temporarily receiving service with a lower-priority RATs while in a particular state, and the UE 110, 120, 200 may revert back to receiving service from higher-priority RATs when the UE 110, 120, 200 is no longer in the particular state.

As described, UE 110, 120, 200 may determine a RAT associated with a lower and/or lowest power consumption among a plurality of RATs supported by the UE 110, 120, 200 by performing a look-up operation in RAT power consumption data 232 stored in memory (e.g., the memory 214, memory in the network mode selection unit 230, or the like). FIG. 5 is exemplary RAT power consumption data (e.g., a RAT power consumption data table) 500 in accordance with various aspects of the present disclosure.

With reference to FIGS. 1-5, the example data 500 may include at least a list of power consumption values respectively associated with a list of a plurality (e.g., each) of RATs operating on the UE 110, 120, 200 or which the UE 110, 120, 200 is configured to support. The information may indicate that a first RAT when operating on the UE 110, 120, 200 (labeled in FIG. 5 as "RAT 1") consumes X milliwatts (mW) (e.g., when the UE camps on a cell using RAT 1); that a second RAT when operating on the UE 110, 120, 200 (labeled in FIG. 5 as "RAT 2") consumes Y mW (e.g., when the UE camps on a cell using RAT 2); and that a third RAT when operating on the UE 110, 120, 200 (labeled in FIG. 5 as "RAT 3") consumes Z mW (e.g., when the UE camps on a cell using RAT 3), where X, Y and Z are numerals and X<Y<Z. In aspects, the data 500 may also indicate each RAT's associated priority.

As described, power consumption of a UE 110, 120, 200 may differ based on a RAT operating on or employed by the UE 110, 120, 200 to acquire service, thereby introducing a possibility for the UE 110, 120, 200 to improve performance (e.g., by reducing and/or improving power consumption). In the example, the RAT power consumption data 500 may include information regarding RATs and power consumed by the UE 110, 120, 200 when such RAT operates on the UE 110, 120, 200. For example, if the UE 110, 120, 200 is within service range of a first base station 402 that is associated with the first RAT RAT1, a second base station 404 associated with the second RAT RAT 2, and a third base station 406 associated with the third RAT RAT 3, the UE 110, 120, 200 (e.g., the network mode selection unit 230 or a processor 206, 216) may use the RAT power consumption data 500 to determine a lowest power RAT among such RATs or a lower power RAT than currently employed to use to acquire service. Thus, by using the RAT power consumption data 500, the UE 110, 120, 200 (e.g., the network mode selection unit 230 or a processor 206, 216) registered to a first network using a first RAT may determine whether to initiate selection or reselection to a second network using a second RAT (e.g., to save power) based on the RAT power consumption data 500. In some embodiments, the UE 110, 120, 200 (e.g., the network mode selection unit 230 or a processor 206, 216) may utilize the information included in the RAT power consumption data 500 to identify and/or select a network mode of operation to effect such selection or reselection. Additionally or alternatively, the RAT power consumption data 500 may include information regarding combinations of two or more RATs and power consumed by the UE 110, 120, 200 when such RATs operate on the UE 110, 120, 200.

Power consumption associated with one or more RATs operating on a UE may be determined in advance by a manufacturer of the UE, a manufacturer of the modems, network operators, and independent parties (e.g., protocol organization, independent testing labs, etc.). Thus, the RAT power consumption data 500 may be predefined and loaded in memory of the UE 110, 120, 200, within one or more of the SIMs, or within a modem within the UE 110, 120, 200. In some embodiments the UE 110, 120, 200 may be configured to generate a RAT power consumption data by recognizing power consumed by the UE 110, 120, 200 operating on one or more of the RATs (e.g., over time).

In various embodiments, a RAT power consumption data (e.g., the RAT power consumption data 500) may be organized according to a variety of data structures or formats, such as an associative list, a database, a linked list, etc. For example, a RAT power consumption data table 500 is a simple data table in which a first RAT can be used as a look-up data field to determine a power consumption (e.g., a UE power consumption) associated with the first RAT. As described with reference to RAT selection or reselection (see FIGS. 4A-4B), selecting a RAT for service associated with a lower or lowest power consumption may effectively be implemented to improve overall performance on the UE 110, 120, 200. In aspects, determining whether to initiate selection or reselection to a second network using a second RAT based on a RAT power consumption data may be further based on one or more other criteria including but not limited to location, network conditions, device activities, device state, subscription priorities, etc.

Figure 6:
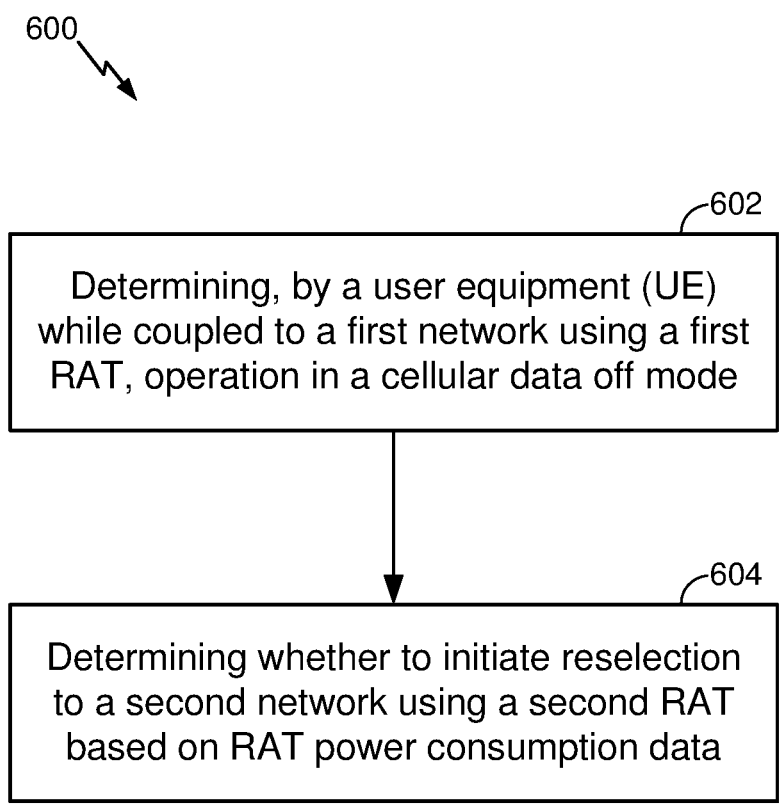
FIG. 6 is a process flow diagram illustrating an exemplary method for network selection in accordance with various aspects of the present disclosure.

FIG. 6 is a process flow diagram illustrating an exemplary method for network selection in accordance with various aspects of the present disclosure. The method 600 may be implemented with a processor (e.g., the general processor 206 of FIG. 2, the baseband modem processor 216, the network mode selection unit 230, a separate controller, and/or the like) of a UE 110, 120, 200 described with reference to FIGS. 1-4B). With reference to FIGS. 1-6, as illustrated, the method 600 of wireless communication includes a number of enumerated steps, but embodiments of the method 600 may include additional steps before, after, and in between the enumerated steps. In some embodiments, one or more of the enumerated steps may be omitted or performed in a different order. At step 602, the method 600 includes determining, by a UE 110, 120, 200 while coupled to a first network using a first RAT, operation in a cellular data off mode.

At step 604, the method 600 includes determining whether to initiate selection or reselection to a second network using a second RAT based on RAT power consumption data. In aspects, RAT power consumption data may include a RAT power consumption data table, RAT power consumption calculations or estimations performed by the UE, and/or RAT power consumption calculations or estimations, for example, performed by one or more base stations, received by the UE). In aspects, the method 600 further comprises identifying a RAT associated with a lowest power consumption or a lower power consumption than the first RAT based on the RAT power consumption data, wherein the identified RAT is the second RAT. In such aspects, the method 600 further comprises adjusting, by the UE, operation from a multi-RAT network mode to another mode of operation based on the second RAT. In such aspects, determining whether to initiate selection or reselection to the second network using the second RAT based on the RAT power consumption data includes selecting or reselecting to the second network if the UE determines that one or more cell selection or reselection criteria associated with the second RAT are satisfied. In aspects, the method 600 further comprises determining a signal level, quality, or power associated with the second network does not satisfy a threshold, and determining whether to initiate selection or reselection to another network using another RAT based on the RAT power consumption data. In aspects, the method 600 further comprises waiting a period of time, and determining whether to initiate selection or reselection to another network using another RAT based on the RAT power consumption data after waiting the period of time. In aspects, the method 600 further comprises receiving, by the UE, via the second network a page associated with a mobile terminated call. In aspects, the method 600 further comprises identifying a third RAT associated with a lower power consumption than the first RAT based on a RAT power consumption data, if the UE determines that one or more cell selection or reselection criteria associated with the second RAT are not satisfied, adjusting the network mode from the mode of operation based on the second RAT to another mode of operation based on the third RAT, and selecting or reselecting to a third network using the third RAT if the UE determines that one or more cell selection or reselection criteria associated with the third RAT are satisfied. In such aspects, the method 600 further comprises receiving, by the UE, via the third network a page associated with a mobile terminated call. In such aspects, the method 600 further comprises determining a signal level, quality, or power associated with the third network does not satisfy a threshold, and employing the RAT power consumption data to determine whether to initiate selection or reselection to another network using another RAT. In aspects, based on RAT power consumption data includes based on a RAT power consumption data table.

In aspects, the method 600 further comprises identifying a RAT associated with a lowest power consumption or a lower power consumption than the first RAT based on the RAT power consumption data, wherein the identified RAT is the first RAT. In such aspects, determining whether to initiate selection or reselection to the second network using the second RAT based on the RAT power consumption data table includes maintaining an RRC idle mode connection to the first network. In such aspects, the method 600 further comprises determining a signal level, quality, or power associated with the first network does not satisfy a threshold, and employing the RAT power consumption data to determine whether to initiate selection or reselection to the second network using a second RAT. In such aspects, the method 600 further comprises identifying the second RAT based on RAT power consumption data, adjusting a network mode of operation from a multi-RAT network mode to another mode of operation based on the second RAT, and selecting or reselecting to the second network using the second RAT if the UE determines that one or more cell selection or reselection criteria are satisfied. In such aspects, the method 600 further includes receiving, by the UE, via the second network a page associated with mobile terminated call. In aspects, while maintaining an RRC idle mode connection to the first network, the method 600 further comprises receiving, by the UE, via the first network a page associated with mobile terminated call.

In aspects, determining whether to initiate selection or reselection to the second network using the second RAT based on the RAT power consumption data is further based on one or more system information messages. In aspects, operation in a cellular data off mode is based on receiving an input via a user interface. In aspects, the one or more system information messages include inter-RAT cell reselection information. In such aspects, determining whether to initiate selection or reselection to the second network using the second RAT based on the RAT power consumption data includes at least one of scanning for or measuring one or more frequencies associated with inter-RAT cell selection or reselection information for just the second RAT, and selecting or reselecting to the second network if the UE determines that one or more cell selection or reselection criteria are satisfied. In such aspects, the RAT power consumption data associates one or more RATs with respective power consumption values.

Figure 7:
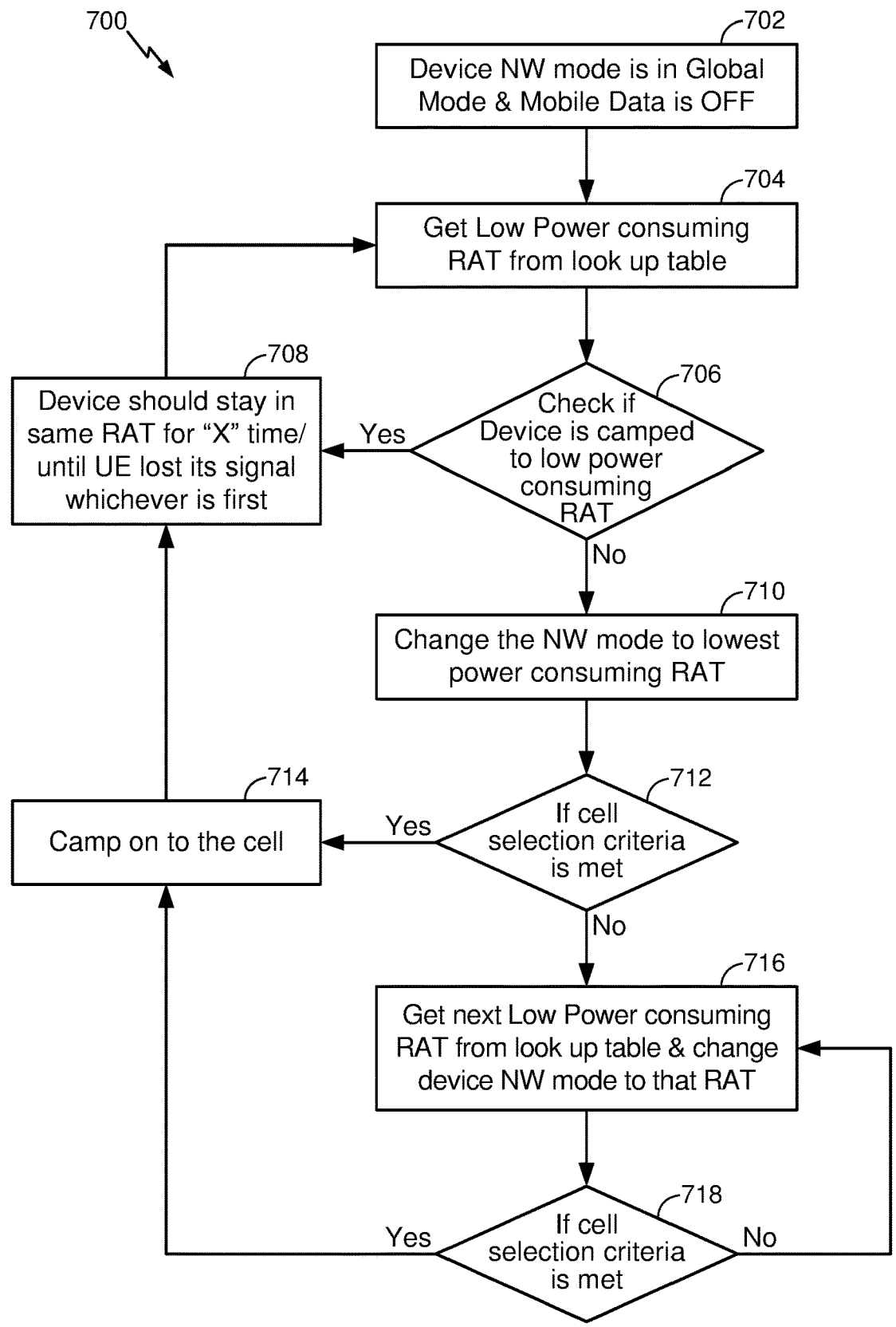
FIG. 7 is a process flow diagram illustrating another exemplary method for network selection in accordance with various aspects of the present disclosure.

FIG. 7 is a process flow diagram 700 illustrating another exemplary method for network selection in accordance with various aspects of the present disclosure. In some embodiments, one or more of the enumerated steps may be omitted or performed in a different order. At step 702, the method 700 includes determining, by a UE 110, 120, 200, operation using a multi-radio access technology (multi-RAT) network mode while in a state of operation in which mobile data or cellular functionality is off or disabled. For example, the UE 110, 120, 200 may be in a multi-RAT (e.g., LTE/3G/1×) network mode of operation having acquired service and registered using such network mode to a network employing a first RAT. Thereafter, the UE 110, 120, 200 may receive an input (e.g., via a user interface) turning off cellular data functionality. For example, the UE 110, 120, 200 may be placed in a low power state and/or the like in which cellular data functionality is turned off. Alternatively, cellular data functionality of the UE 110, 120, 200 may be turned off, for example, based on a input via a user interface from a user. While in such a state (e.g., in which cellular data functionality is turned off or disabled), the UE 110, 120, 200 employs a network connection to monitor for paging (e.g., associated with a voice call) rather than data traffic communication. Thus, the UE 110, 120, 200 may camp on the first network (e.g., in an RRC idle mode) and monitor for paging.

However, in addition to the first network operating on the first RAT, other networks employing other respective RATs also support paging. Thus, the UE 110, 120, 200 may improve performance by coupling or connecting to one of the other networks operating on another RAT if such other RAT is associated with a lower UE power consumption than the first RAT. At step 704, the UE 110, 120, 200 (e.g., the general processor 206 of FIG. 2, the baseband modem processor 216, the network mode selection unit 230, a separate controller, and/or the like) may determine and/or select a RAT associated with a low or lowest UE power consumption (e.g., while a UE is in camped on a network using such RAT) based on accessing, indexing and/or performing a lookup using the RAT power consumption data 500. At step 706, the UE 110, 120, 200 (e.g., the general processor 206 of FIG. 2, the baseband modem processor 216, the network mode selection unit 230, a separate controller, and/or the like) may determine or check whether the UE 110, 120, 200 is camped on or to a network using the selected RAT. If the UE 110, 120, 200 determines the UE 110, 120, 200 is camped on a network using the selected RAT, at step 708, the UE 110, 120, 200 remains camped on (e.g., maintaining an RRC idle mode connection to) the current network (e.g., the first network) until one or more cell selection or reselection criteria associated with the current network operating on the current RAT (e.g., first RAT) are satisfied. One or more cell selection or reselection criteria associated with the first network operating on the first RAT may be satisfied if a signal level, power, or quality metric (e.g., Reference signal received power (RSRP) or Reference Signal Received Quality (RSRQ)) of a serving cell for the UE 110, 120, 200 worsens below a threshold, for example. If one or more cell selection or reselection criteria associated with the first network operating on the first RAT are satisfied, the method 700 proceeds to step 704.

Alternatively, if at step 706, the UE 110, 120, 200 determines the UE 110, 120, 200 is not camped on a network using the selected RAT, at step 710, the UE 110, 120, 200 (e.g., the general processor 206 of FIG. 2, the baseband modem processor 216, the network mode selection unit 230, a separate controller, and/or the like) may adjust the network mode of operation of the UE 110, 120, 200. For example, the UE 110, 120, 200 may change (e.g., dynamically change) the network mode from global network mode or a multi-RAT network mode (e.g., LTE/3G/1× network mode) to a network mode of operation based on the selected RAT. For example, if the selected network mode of operation is 3G, then the UE 110, 120, 200 may change the network mode to 3G network mode. In this manner, the UE 110, 120, 200 may cause a search and acquisition of service from a second network operating on a second RAT, in this example, 3G. Based on the change in network mode to 3G network mode, the UE 110, 120, 200 will search wireless networks employing 3G RAT for a suitable cell from which it can receive communication services.

For example, if the UE 110, 120, 200 detects such a wireless network, the UE 110, 120, 200 may select the wireless network to serve the UE 110, 120, 200 and such wireless network may be referred to as the serving network. The UE 110, 120, 200 may operate in an idle mode and camp on the serving network if active communication is not required by UE 110 (e.g., which is the case in this example because the UE 110, 120, 200 is in a state in which cellular data functionality is turned off or disabled). As described above, the UE 110, 120, 200 may be located within the coverage of cells of multiple frequencies. In aspects, because the UE was previously-registered to the first network, the UE may have received system information for inter-RAT reselection. The system information may include one or more system information blocks (e.g., system information block type 6 (SIB6) including information about UTRA frequencies and UTRA neighboring cells relevant for cell selection or reselection, system information block type 7 (SIB7) including information about GERAN frequencies and GERAN neighboring cells relevant for cell selection or reselection, system information block type 8 (SIB8) including information about CDMA2000 frequencies and CDMA2000 neighboring cells relevant for cell selection or reselection, System Information 2 Quarter (SI2Q) message including information about UTRA frequencies and UTRA neighboring cells relevant for cell selection or reselection for a UE coupled to a 2G serving cell, etc.) depending on the RAT to which the UE was registered. In this example, since the UE was registered to a first RAT which is an LTE RAT, the UE 110, 120, 200 may have received SIB6, SIB7 and/or SIB8. For example, based on receiving SIB6, the UE 110, 120, 200, has information about 3G frequencies and 3G neighboring cells relevant for cell selection or reselection. Based on this information, the UE 110, 120, 200 may select a frequency in an attempt to camp on a cell of a network using 3G RAT. More specifically, the UE 110, 120, 200 may operate in an idle mode as follows. The UE 110, 120, 200 may identify a 3G frequency on which it is able to find a "suitable" cell in a normal scenario, where "suitable" is specified in the 3GPP standards. UE 110, 120, 200 may then camp on the such cell.

For example, at step 712, the UE 110, 120, 200 may determine whether one or more cell selection criteria (e.g., as specified in the 3GPP standards) for a cell are met. If so, at step 714, the UE 110, 120, 200 may camp on the cell. At step 708, the UE 110, 120, 200 may remain on the current RAT network for a period of time (e.g., X time units), which may be predetermined and/or until the UE 110, 120, 200 begins to lose or loses its signal, whichever occurs first. For example, assume the UE 110, 120, 200 switched to a low power consumption RAT (e.g., 2G), the 2G RAT experienced signal loss such that the UE 110, 120, 200 checked the power consumption data table and found a next RAT (e.g., a 3G or 4G RAT) as per power table. If only a 3G/4G RAT was available at that time, the UE 110, 120, 200 camped on a cell for the 3G/4G RAT, which is the current RAT network (e.g., and which may be associated with a higher power consumption than the 2G RAT). Thus, in such scenario, at step 708, the UE 110, 120, 200 may not remain on the current RAT network until a signal loss is observed, but rather may wait for a period of time, X, after expiry of which UE 110, 120, 200 may check for next RAT (e.g., a lower or the lowest power RAT such as 2G, for example) in the power consumption data. As a further example, at step 708, the UE 110, 120, 200 remains camped on (e.g., maintaining an RRC idle mode connection to) the current network (e.g., the second network) until one or more cell selection or reselection criteria associated with the current network operating on the current RAT (e.g., second RAT) are satisfied, for example. One or more cell selection or reselection criteria associated with the second network operating on the second RAT may be satisfied if a signal strength, level, power and/or quality metric of the serving cell for the UE 110, 120, 200 worsens below a threshold, for example. Alternatively, if at step 712, the UE 110, 120, 200 determines one or more cell selection criteria (e.g., as specified in the 3GPP standards) for a cell are not met, step 716 may be performed. At step 716, the UE 110, 120, 200 (e.g., the general processor 206 of FIG. 2, the baseband modem processor 216, the network mode selection unit 230, a separate controller, and/or the like) may determine and/or select another RAT associated with a low or lowest UE power consumption (e.g., while a UE is in camped on a network using the first RAT) based on accessing, indexing and/or performing a lookup using the RAT power consumption data 500. The UE 110, 120, 200 may change (e.g., dynamically change) the network mode to a network mode of operation based on the selected other RAT. For example, the UE 110, 120, 200 may select RAT 3 (e.g., 1×RAT) and change (e.g., dynamically change) from 3G network mode to a network mode of operation based on the selected RAT (e.g., a 1× network mode).

In this manner, the UE 110, 120, 200 may cause a search and acquisition of service from a third network operating on a third RAT, in this example, 1×. Based on the change in network mode to the 1× network mode, the UE 110, 120, 200 will search wireless networks employing 1×RAT for a suitable cell from which it can receive communication services. For example, if the UE 110, 120, 200 detects such a wireless network, the UE 110, 120, 200 may select the wireless network to serve the UE 110, 120, 200 and such wireless network may be referred to as the serving network. The UE 110, 120, 200 may operate in an idle mode and camp on the serving network if active communication is not required by UE 110 (e.g., which is the case in this example because the UE 110, 120, 200 is in a state in which cellular data functionality is turned off or disabled). As described above, because the UE was previously-registered to the first network, the UE may have received system information for inter-RAT reselection. The system information may include one or more system information blocks depending on the RAT to which the UE was registered. In this example, since the UE was registered to a first RAT which is an LTE RAT, the UE 110, 120, 200 may have received SIB8. For example, based on receiving SIB8, the UE 110, 120, 200, has information about 1× frequencies and 1× neighboring cells relevant for cell selection or reselection. Based on this information, the UE 110 may select a frequency in an attempt to camp on a cell of a network using 1×RAT. More specifically, the UE 110, 120, 200 may operate in an idle mode as follows. The UE 110, 120, 200 may identify a 1× frequency on which it is able to find a cell. UE 110, 120, 200 may then camp on such cell. For example, at step 718, the UE 110, 120, 200 may determine whether one or more cell selection criteria for a cell are met (e.g., if a signal strength, level, power and/or quality metric of the serving cell for the UE 110, 120, 200 satisfies a threshold). If not, step 716 is performed. If so, at step 714, the UE 110, 120, 200 may camp on the cell. In this manner, the exemplary method for network selection of FIG. 7 may reduce power consumed by a UE by selecting a network mode of operation for the UE 110, 120, 200 based on an operating state of the UE and/or a power consumption associated with an associated RAT.

In this manner, the present methods and apparatus may provide intelligent network selection for power saving. For example, from a user perspective, when Mobile Data is OFF, it will not make a difference to which RAT (e.g., LTE/3G/2G) the UE is camped because when Mobile Data is OFF, a UE camps on to a network only for paging. By intelligently selecting a network mode that consumes less power (e.g., than other potential modes) when Mobile Data is OFF, the UE saves power. For example, when the UE is in the global network mode (e.g., LTE/3G/2G/TDSCDA/1× etc.) and mobile data is OFF, if the UE camps on to a RAT and if the signal strength is good, rather than having the UE remain on the same RAT irrespective of power consumed in that RAT, in aspects, the present methods and apparatus may employ a power based data look up that may be implemented in software which may let the UE determine or know a RAT that consumes less or least power. Based on the data look up, the UE will camp on to that RAT which consumes less or least power. Thusly, for example, avoiding a scenario in which, if the UE is camped to LTE which consumes more power than 2G or 3G, the UE stays in LTE until an inter-RAT reselection is required (e.g., in case of LTE signal strength goes bad). Furthermore, according to aspects of the present methods and apparatus, a UE may save power because the UE will be camped to the lesser or least power consuming RAT (e.g., of a plurality of RATs) when mobile data is OFF. Additionally, or alternatively, the UE may save power because the UE will not search and/or measure all the RATs every time (e.g., but rather a subset of the RATs including or just including the determined lesser or least power consuming RAT).

Figure 8:
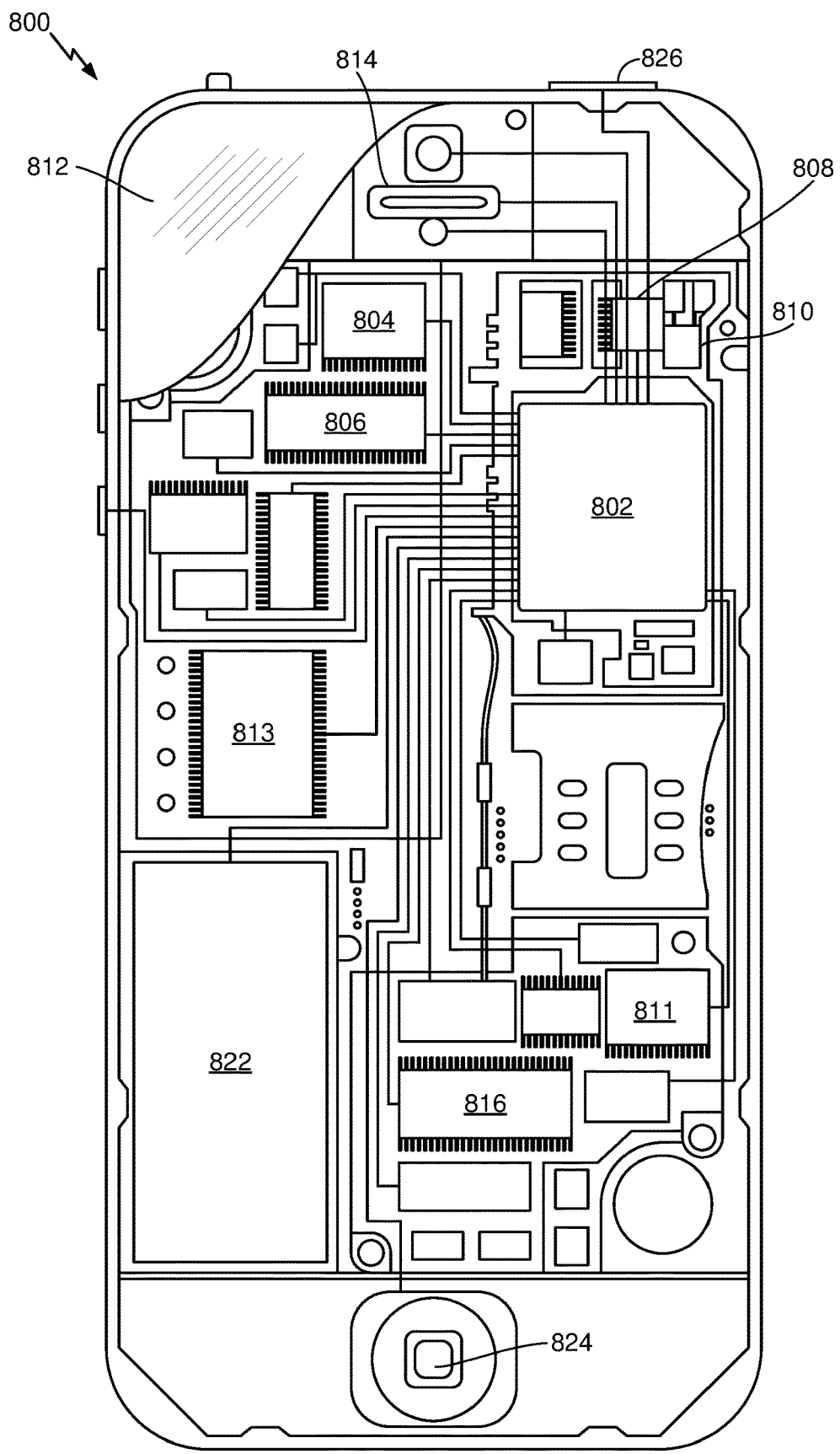
FIG. 8 is a component block diagram of a user equipment (UE) in accordance with various aspects of the present disclosure.

Various embodiments may be implemented in any of a variety of UEs or wireless communication devices, an example on which (e.g., UE 800) is illustrated in FIG. 8. According to various embodiments, the UE 800 may be similar to the UEs 110, 120, 200 as described above with reference to FIGS. 1-4 and 6-7. As such, the UE 800 may implement the methods 600, 700 in FIGS. 6-7. Thus, with reference to FIGS. 1-8, the UE 800 may include a processor 802 coupled to a touchscreen controller 804 and an internal memory 806. The processor 802 may be one or more multi-core integrated circuits designated for general or specific processing tasks. In aspects, the processor 802 may perform one or more steps of the methods 600, 700. The internal memory 806 may be volatile or non-volatile memory, and may also be secure and/or encrypted memory, or unsecure and/or unencrypted memory, or any combination thereof. The touchscreen controller 804 and the processor 802 may also be coupled to a touchscreen panel 812, such as a resistive-sensing touchscreen, capacitive-sensing touchscreen, infrared sensing touchscreen, etc. Additionally, the display of the UE 800 need not have touch screen capability.

The UE 800 may have one or more cellular network transceivers 808, 816 coupled to the processor 802 and to two or more antennae 810, 811 and configured for sending and receiving cellular communications. The transceivers 808, 816 and the antennae 810, 811 may be used with the above-mentioned circuitry to implement the various embodiment methods. The UE 800 may include one or more SIM cards (e.g., SIM 813) coupled to the transceivers 808, 816 and/or the processor 802 and configured as described above.

The UE 800 may also include speakers 814 for providing audio outputs. The UE 800 may also include a housing 820, constructed of a plastic, metal, or a combination of materials, for containing all or some of the components discussed herein. The UE 800 may include a power source 822 coupled to the processor 802, such as a disposable or rechargeable battery. The rechargeable battery may also be coupled to the peripheral device connection port to receive a charging current from a source external to the UE 800. The UE 800 may also include a physical button 824 for receiving user inputs. The UE 800 may also include a power button 826 for turning the UE 800 on and off. As indicated above, FIG. 8 is provided merely as an example. Other examples are possible and may differ from what was described with regard to FIG. 8. Additionally, or alternatively, different configurations of a UE than that shown in FIG. 8 may be used.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to some embodiments without departing from the spirit or scope of the invention. Thus, the present invention is not intended to be limited to the embodiments shown herein but is to be accorded the widest scope consistent with the following claims and the principles and novel features disclosed herein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   determining, by a user equipment (UE) while coupled to a first network using a first radio access technology (RAT), operation in a cellular data off mode;
   determining, by the UE, whether to initiate selection or reselection to a second network using a second RAT based on RAT power consumption data;
   identifying that the second RAT is associated with a lower power consumption than the first RAT based on the RAT power consumption data; and
   adjusting, by the UE, service acquisition operation from a multi-RAT network mode to a single-RAT network mode based on the second RAT, wherein the multi-RAT network mode operation comprises acquiring service using multiple RATs and the single-RAT network mode operation based on the second RAT comprises acquiring service using the second RAT.

2. The method of claim 1, wherein priority of the second RAT is lower than priority of the first RAT.

3. The method of claim 1, wherein determining whether to initiate selection or reselection to the second network using the second RAT based on the RAT power consumption data includes reselecting to the second network if the UE determines that one or more cell selection or reselection criteria associated with the second RAT are satisfied.

4. The method of claim 3, further comprising:
   determining a signal level, quality, or power associated with the second network does not satisfy a threshold; and
   determining whether to initiate selection or reselection to another network using another RAT based on the RAT power consumption data.

5. The method of claim 3, further comprising:
   waiting a period of time; and determining whether to initiate selection or reselection to another network using another RAT based on the RAT power consumption data after waiting the period of time.

6. The method of claim 3, further comprising:
identifying a third RAT associated with a lower power consumption than the first RAT based on the RAT power consumption data, if the UE determines that one or more cell selection or reselection criteria associated with the second RAT are not satisfied;
adjusting the network mode from the mode of operation based on the second RAT to another mode of operation based on the third RAT; and
selecting or reselecting to a third network using the third RAT if the UE determines that one or more cell selection or reselection criteria associated with the third RAT are satisfied.

7. The method of claim 6, further comprising:
determining a signal level, quality, or power associated with the third network does not satisfy a threshold; and
employing the RAT power consumption data to determine whether to initiate selection or reselection to another network using another RAT.

8. The method of claim 1, wherein the RAT power consumption data is associated with consumed power when the UE camps on a cell using each RAT.

9. The method of claim 1, wherein determining whether to initiate selection or reselection to the second network using the second RAT based on the RAT power consumption data includes maintaining an RRC idle mode connection to the first network.

10. The method of claim 9, further comprising:
determining a signal level, quality, or power associated with the first network does not satisfy a threshold; and
employing the RAT power consumption data to determine whether to initiate selection or reselection to the second network using the second RAT.

11. The method of claim 1, wherein determining whether to initiate selection or reselection to the second network using the second RAT based on the RAT power consumption data is further based on one or more system information messages.

12. The method of claim 11, wherein the one or more system information messages include inter-RAT cell selection or reselection information.

13. The method of claim 12, wherein determining whether to initiate selection or reselection to the second network using the second RAT based on the RAT power consumption data includes:
at least one of scanning for or measuring one or more frequencies associated with inter-RAT cell selection or reselection information for just the second RAT; and
selecting or reselecting to the second network if the UE determines that one or more cell selection or reselection criteria are satisfied.

14. The method of claim 1, wherein the RAT power consumption data associates one or more RATs with respective power consumption values based on a RAT power consumption data table.

15. The method of claim 1, wherein the operation in the cellular data off mode is based on receiving an input via a user interface.

16. A user equipment (UE) for wireless communication, comprising:
a memory; and
at least one processor coupled to the memory, the at least one processor configured to:
determine, while coupled to a first network using a first radio access technology (RAT), operation in a cellular data off mode;
determine whether to initiate selection or reselection to a second network using a second RAT based on RAT power consumption data;
identify that the second RAT is associated with a lower power consumption than the first RAT based on the RAT power consumption data; and
adjust service acquisition operation from a multi-RAT network mode to a single-RAT network mode based on the second RAT, wherein the multi-RAT network mode operation comprises acquiring service using multiple RATs and the single-RAT network mode operation based on the second RAT comprises acquiring service using the second RAT.

17. The UE of claim 16, wherein priority of the second RAT is lower than priority of the first RAT.

18. The UE of claim 16, wherein determine whether to initiate selection or reselection to the second network using the second RAT based on the RAT power consumption data is further based on one or more system information messages.

19. The UE of claim 16, wherein the RAT power consumption data is associated with consumed power when the UE camps on a cell using each RAT.

20. The UE of claim 16, wherein the RAT power consumption data associates one or more RATs with respective power consumption values based on a RAT power consumption data table.

21. The UE of claim 16, wherein the operation in the cellular data off mode is based on receiving an input via a user interface.

22. A non-transitory computer-readable medium storing one or more instructions for wireless communication by a wireless communication device,
the one or more instructions, when executed by one or more processors of a user equipment (UE), causing the one or more processors to:
determine, while coupled to a first network using a first radio access technology (RAT), operation in a cellular data off mode;
determine whether to initiate selection or reselection to a second network using a second RAT based on RAT power consumption data;
identify that the second RAT is associated with a lower power consumption than the first RAT based on the RAT power consumption data; and
adjust service acquisition operation from a multi-RAT network mode to a single-RAT network mode based on the second RAT, wherein the multi-RAT network mode operation comprises acquiring service using multiple RATs and the single-RAT network mode operation based on the second RAT comprises acquiring service using the second RAT.

23. An apparatus for wireless communication, comprising:
means for determining, by a UE while coupled to a first network using a first radio access technology (RAT), operation in a cellular data off mode;
means for determining, by the UE, whether to initiate selection or reselection to a second network using a second RAT based on RAT power consumption data;
means for identifying, by the UE, that the second RAT is associated with a lower power consumption than the first RAT based on the RAT power consumption data; and means for adjusting, by the UE, service acquisition operation from a multi-RAT network mode to a single-RAT network mode based on the second RAT, wherein the multi-RAT network mode operation comprises acquiring service using multiple RATs and the single-RAT network mode operation based on the second RAT comprises acquiring service using the second RAT.

24. The apparatus of claim 23, wherein priority of the second RAT is lower than priority of the first RAT.

25. The apparatus of claim 23, wherein determining whether to initiate selection or reselection to the second network using the second RAT based on the RAT power consumption data is further based on one or more system information messages.

* * * * *